(12) United States Patent
Chase (10) Patent No.: US 11,692,544 B2
(45) Date of Patent: Jul. 4, 2023

(54) SCRAPER RING ASSEMBLY (71) Applicant: GD ENERGY PRODUCTS, LLC, Tulsa, OK (US)

(72) Inventor: John Chase, Deer Park, TX (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 319 days.

(21) Appl. No.: 16/953,961

(22) Filed: Nov. 20, 2020

(65) Prior Publication Data

US 2022/0163032 A1 May 26, 2022

(51) Int. Cl.
| | |
|---|---|
| *F04B 53/00* | (2006.01) |
| *F04B 53/16* | (2006.01) |
| *F04B 53/18* | (2006.01) |
| *F16J 9/20* | (2006.01) |

(52) U.S. Cl.
CPC .............. *F04B 53/00* (2013.01); *F04B 53/16* (2013.01); *F04B 53/18* (2013.01); *F16J 9/20* (2013.01)

(58) Field of Classification Search
CPC ........ F04B 53/00; F04B 53/16; F04B 53/164; F04B 53/18; F04B 53/121; F16J 15/183; F16J 15/184; F16J 15/20; F16J 9/20; F16J 9/203; F02F 5/00
See application file for complete search history.

(56) References Cited

U.S. PATENT DOCUMENTS

| | | | |
|---|---|---|---|
| 1,313,320 A | 8/1919 | Miller | |
| 1,372,529 A | 3/1921 | Mastin | |
| 1,389,635 A | 9/1921 | Dunkle | |
| 2,212,291 A | 8/1940 | Heinze et al. | |
| 2,442,687 A | 6/1948 | Heathcott | |
| 2,658,809 A | 11/1953 | Schultz | |
| 2,819,102 A | 1/1958 | Horvath | |
| 2,907,614 A | 10/1959 | Rosen | |
| 3,013,830 A | 12/1961 | Milligan | |
| 3,094,337 A | 6/1963 | Pippert et al. | |
| 3,120,960 A | 2/1964 | Pippert et al. | |
| 3,244,399 A | 4/1966 | Jones et al. | |
| 3,271,039 A | 9/1966 | Kohl et al. | |
| 3,419,280 A | 12/1968 | Wheeler | |
| 3,429,385 A | 2/1969 | Jones et al. | |
| 3,554,563 A * | 1/1971 | Schumacher | F16J 15/20 277/540 |
| 3,719,366 A | 3/1973 | Pippert | |
| 4,219,204 A | 8/1980 | Pippert | |

(Continued)

FOREIGN PATENT DOCUMENTS

EP 0229005 B1 4/1989

*Primary Examiner* — Grant Moubry
(74) *Attorney, Agent, or Firm* — Edell, Shapiro & Finnan, LLC (57) ABSTRACT

An annular scraper ring assembly for a packing arrangement is disclosed. The annular scraper ring assembly can form a seal with a plunger included in a fluid end of a reciprocating pump and includes two or more rings, including a first ring and a second ring. The first ring is formed from a resilient material configured to form a seal against a plunger included in a fluid end of a reciprocating pump and includes an upstream face and an inner surface. The second ring defines a caroming surface configured to engage the upstream face of the first ring and cam the inner surface inwards when the first ring is compressed against the second ring.

20 Claims, 6 Drawing Sheets

(56) References Cited

U.S. PATENT DOCUMENTS

| | | | |
|---|---|---|---|
| 4,440,404 A | 4/1984 | Roach et al. | |
| 4,474,382 A | 10/1984 | Hjelsand | |
| 4,576,385 A * | 3/1986 | Ungchusri | F16J 15/184 |
| | | | 277/540 |
| 4,619,436 A | 10/1986 | Bonzer et al. | |
| 5,738,358 A | 4/1998 | Kalsi et al. | |
| 6,182,974 B1 * | 2/2001 | Harrelson, III | F16J 15/26 |
| | | | 277/548 |
| 9,534,691 B2 | 1/2017 | Miller et al. | |
| 9,845,801 B1 * | 12/2017 | Shek | F04B 53/02 |
| D895,777 S | 9/2020 | Chase et al. | |
| 2012/0152111 A1 * | 6/2012 | Byrne | F04B 53/143 |
| | | | 29/888.3 |
| 2013/0319220 A1 * | 12/2013 | Luharuka | F16J 15/18 |
| | | | 92/165 R |
| 2016/0319626 A1 * | 11/2016 | Dille | E21B 33/08 |
| 2019/0085978 A1 * | 3/2019 | Chase | F16J 15/184 |
| 2019/0170137 A1 * | 6/2019 | Chase | F04B 53/164 |

* cited by examiner

SCRAPER RING ASSEMBLY

FIELD OF INVENTION

The present invention relates to the field of high pressure reciprocating pumps and, in particular, a sealing arrangement for high pressure reciprocating pumps.

BACKGROUND

High pressure reciprocating pumps are often used to deliver high pressure fluids during earth drilling operations. A sealing arrangement is provided between a pump casing and a reciprocating plunger to reduce the likelihood of leakage and to protect the plunger from potential damage from any abrasive components that may be contained in the fluid being pumped.

SUMMARY

The present application relates to a scraper ring assembly for a packing arrangement of a high pressure reciprocating pump. The scraper ring assembly may be provided independent of any other elements incorporated in a packing arrangement, and/or incorporated in a reciprocating pump.

More specifically, in accordance with at least one embodiment, the present application is directed to an annular scraper ring assembly for a packing arrangement that can form a seal with a plunger included in a fluid end of a reciprocating pump. The scraper ring assembly includes two or more rings, including a first ring and a second ring. The first ring includes an upstream face and an inner surface and is formed from a resilient material configured to form a seal against a plunger included in a fluid end of a reciprocating pump. The second ring defines a camming surface configured to engage the upstream face of the first ring and cam the inner surface of the first ring inwards when the first ring is compressed against the second ring. Thus, advantageously, when the scraper ring assembly is compressed, the camming will increase the magnitude of sealing forces generating by compressing the first ring against the plunger and/or increase the length of time over which sufficient sealing forces are generated. This may protect downstream components of the packing arrangement, as well as downstream portions of the scraper ring assembly, from debris (i.e., abrasive materials) and extend the lifespan of the packing arrangement.

In at least some embodiments, the resilient material of the first ring comprises at least a resilient elastomeric material. In at least some of these embodiments, the second ring is also formed from the resilient material. Alternatively, the second ring may be formed from a second material with a resiliency that is less than a resiliency of the resilient material. That is, the second ring may be formed from a stiffer or less resilient material than the first ring. Forming the second ring from a stiffer material may extend the lifespan of the second ring as compared to the first ring, which may be important since the second ring is upstream of the first ring and may be exposed to more high pressure fluid and abrasive debris than the first ring (e.g., if the second ring functions like a conventional junk ring). On the other hand, forming the second ring from a resilient material, such as the same material as the first ring may allow the second ring to form a seal against a plunger, such as in combination with the first ring, which may provide seal redundancy that expands the life of the scraper ring assembly.

In at least some embodiments, the annular scraper ring assembly also includes a third ring. The third ring has a planar downstream surface and the second ring has an upstream face disposed opposite the camming surface that is configured to engage the planar downstream face of the third ring. The third ring is formed from a third material with a resiliency that is less than the resiliency of the material used to form the first ring. In such embodiments, the third ring may have a longer lifespan than the first ring or second ring, which may be important since the third ring is upstream of the first and second rings and may be exposed to more high pressure fluid and abrasive debris than the first ring (e.g., if the second ring functions like a conventional junk ring). Moreover, forming the third ring from a stiffer material may provide a surface against which the first and second rings can compress to cause radial expansion of the first ring and/or the second ring.

Still further, in some embodiments, the upstream face of the first ring and the inner surface of the first ring meet at a sharp leading edge and the inner surface defines a tapered section that tapers away from the plunger along a downstream direction so that the first ring is widest at the upstream face. Additionally or alternatively, the annular scraper ring assembly may not include a pedestal. These features, either alone or in combination, eliminate any pockets that might encourage a "nibbling" phenomenon that damages sealing elements (i.e., rings). Additionally, the sharp leading edge and the tapered section may effectively peel debris off the plunger, to protect downstream elements of a packing arrangement from debris.

In accordance with another embodiment, the present application is directed to a packing arrangement for a fluid end of a reciprocating pump. The packing arrangement is installable within a packing box disposed at the fluid end of a reciprocating pump and is arranged to form a seal with a plunger of the reciprocating pump. The packing arrangement includes one or more pressure rings and a scraper ring assembly. The scraper ring is disposed upstream of the one or more pressure rings and may include any combination of the features of the scraper ring assembly described above.

In some embodiments, the packing arrangement may also include a packing nut disposed downstream of the one or more pressure rings. The packing nut may be configured to compress at least the one or more pressure rings and the first ring of the scraper ring assembly to cause radial expansion of at least the one or more pressure rings and the first ring within the packing box. Among other advantages, this may secure the scraper ring in a sealed position that prevents blow-by leakage. Additionally or alternatively, the packing arrangement may include a lantern ring disposed between the one or more pressure rings and the packing nut. The lantern ring defines one or more lube oil bores that allow lubricant to be delivered to an outer surface of the plunger. This oil delivery may ensure that sealing rings (e.g., the first ring) can form a proper seal against a reciprocating plunger.

In accordance with another embodiment, the present application is directed to a reciprocating pump include a casing defining a pumping chamber, a plunger configured to reciprocate in an axial direction within the pumping chamber, and an annular scraper ring assembly that can form a seal with the plunger. The annular scraper ring may include any combination of the features of the scraper ring assembly described above.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the scraper ring assembly presented herein improves upon existing sealing arrangements for high pressure reciprocating pumps by improving sealing forces generated by the sealing arrangement and extending the lifespan of the sealing arrangement. To achieve these improvements, the scraper ring assembly includes a first ring and a second ring, insofar as "first" and "second" herein are used to refer to particular rings of two or more rings included in the scraper ring assembly and are not intended to denote a specific location of the ring in a stack or packing arrangement. The first ring mates with a downstream face of the second ring in a manner that cams the first ring into contact with a plunger to increase sealing or compression forces between the first ring and the plunger.

More specifically, the second ring includes a downstream face with a camming surface while the first ring includes an upstream face configured to mate with the camming surface. Thus, when compressed, the inner surface of the first ring is pushed or urged radially inwards, increasing the magnitude of sealing forces generated against the plunger and/or the length of time that sealing forces are exerted. Consequently, these features help achieve a sufficient seal while also extending the lifespan of the scraper ring assembly (and, thus, the lifespan of the packing).

Additionally, the scraper ring assembly presented herein improves debris control. To improve debris control, at least the first ring of the scraper ring assembly has a sharp, highly compressed leading edge. The sharp leading edge peels debris off the plunger. Meanwhile, the shape of the first ring focuses the largest concentration of seal compression forces at or adjacent the upstream face, forming a strong seal that protects both downstream portions of the first ring and downstream rings from high pressure debris. Collectively, the sharp leading edge of the first ring and the overall shape of the rings included in the scraper ring assembly may replace or eliminate a pedestal so that the scraper ring assembly presented does not include any pockets on or adjacent its upstream face that might encourage a "nibbling" phenomenon that damages sealing elements (i.e., rings).

Figure 1:
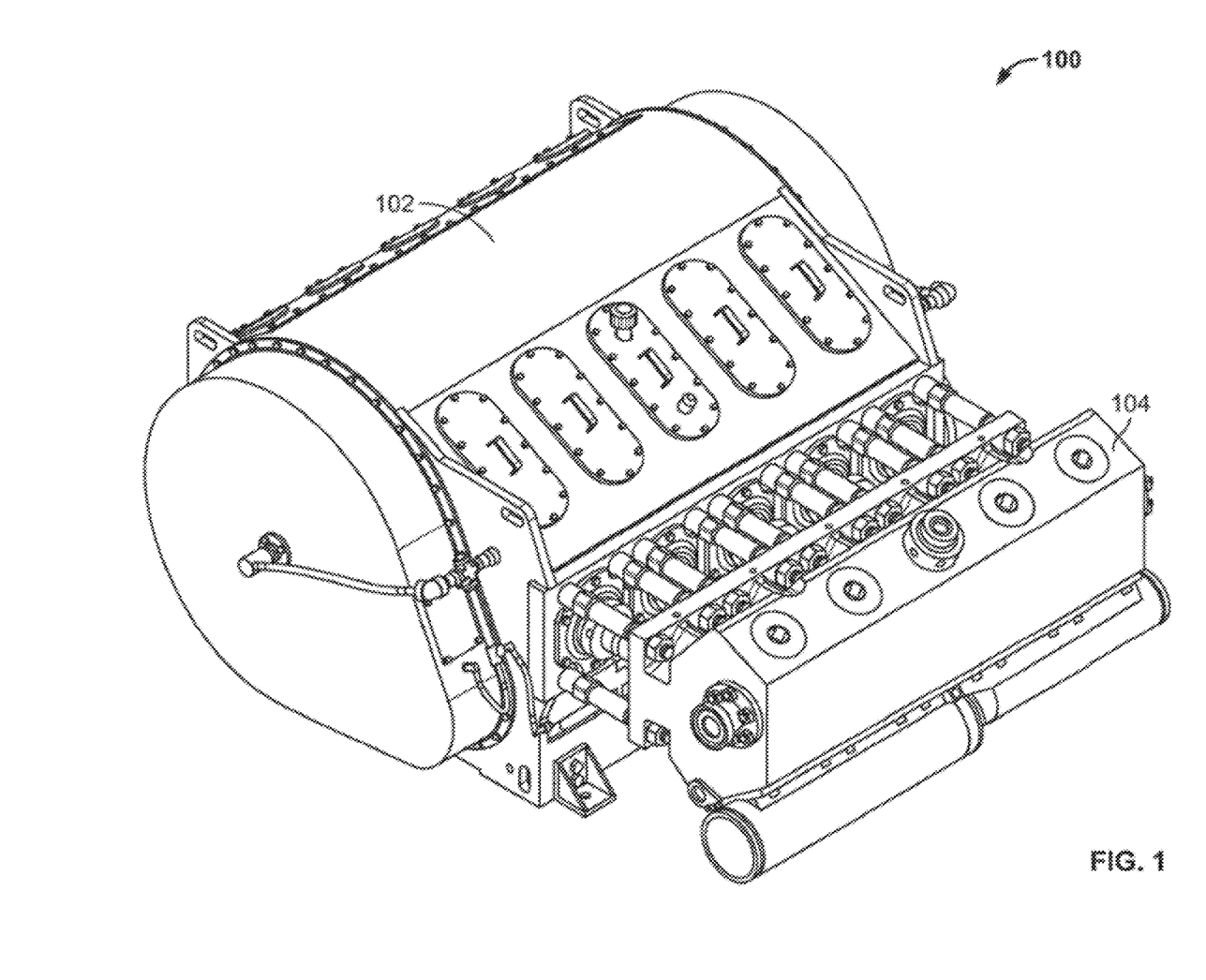
FIG. 1 is a perspective view of a reciprocating pump including a fluid end.

Now referring to FIG. 1 for a description of an exemplary embodiment of a reciprocating pump 100 in which the scraper ring assembly presented herein may be included. The reciprocating pump 100 includes a power end 102 and a fluid end 104. The power end 102 includes a crankshaft that drives a plurality of reciprocating plungers within the fluid end 104 to pump fluid at high pressure. Generally, the power end 102 is capable of generating forces sufficient to cause the fluid end 104 to deliver high pressure fluids to earth drilling operations. For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations.

Often, the reciprocating pump 100 may be quite large and may, for example, be supported by a semi-tractor truck ("semi") that can move the reciprocating pump 100 to and from a well. For example, in some instances, a semi may move the reciprocating pump 100 off a well when the reciprocating pump 100 requires maintenance. However, a reciprocating pump 100 is typically moved off a well only when a replacement pump (and an associated semi) is available to move into place at the well, which may be rare. Thus, often, the reciprocating pump is taken offline at a well and maintenance is performed while the reciprocating pump 100 remains on the well. If not for this maintenance, the reciprocating pump 100 could operate continuously to extract natural oil and gas. Consequently, any improvements that extend the lifespan of components of the reciprocating pump 100, especially typical "wear" components, and extend the time between maintenance operations (i.e., between downtime) are highly desirable.

Figure 2:
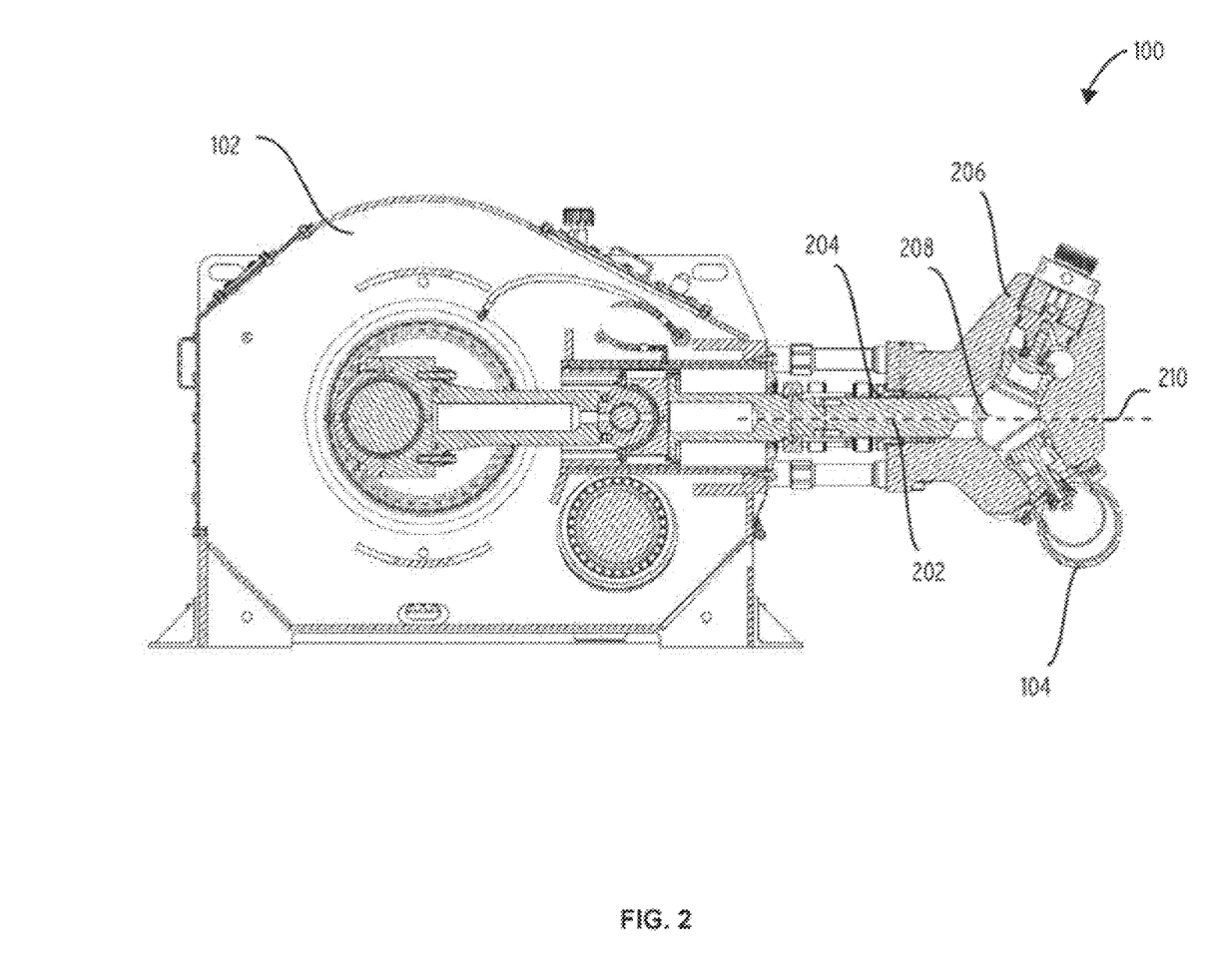
FIG. 2 is a cross sectional view of the reciprocating pump of FIG. 1, taken along a plane that is parallel to a plunger axis.

FIG. 2 is a sectional view taken through a central or plunger axis 210 of one of the plungers 202. Each of the pumping chambers 208 of the reciprocating pump 100 includes a plunger 202 that reciprocates within a casing 206 of the fluid end 104. With each stroke of the plunger 202, low pressure fluid is drawn into the pumping chamber 208 and high pressure fluid is discharged. Often, the fluid within the pumping chamber 208 contains abrasive material (i.e., "debris") that can damage the reciprocating pump 100. Thus, a packing arrangement 204 is positioned between the casing 206 and the plunger 202 to form a seal therebetween.

In such a reciprocating pump 100, the stroke length of the plunger 202 may be relatively short and, thus, only a limited amount of axial space is available for the packing arrangement 204. That is, due to the small stroke length, gas and oil reciprocating pumps for which the scraper ring assembly presented herein is useful have a constrained linear space for a sealing arrangement. For example, the stroke length may be between approximately six and approximately twelve inches. This often limits the types and sized of components that can be included in packing arrangement 204.

For example, conventional packing arrangements for short-stroke pumps have been unable to incorporate wiper seals that are often included in equipment that applies hydraulic loads (e.g., construction equipment), which often have longer stroke lengths that provide more room for sealing elements and/or provide seals against significantly lower pressures. This limits the effectiveness with which conventional packing arrangements may remove or detach debris from a plunger 202, which, in turn, limits the effectiveness and/or the lifespan of conventional packing arrangements. In fact, as fracking continues to be deployed in more extreme conditions, the pressure, flow rate, and amount of sand introduced into a well continues to increase by orders of magnitude. This generates more debris that conventional packing arrangements struggle to handle while further emphasizing the need for strong and effective seals in a small axial space.

Figure 3:
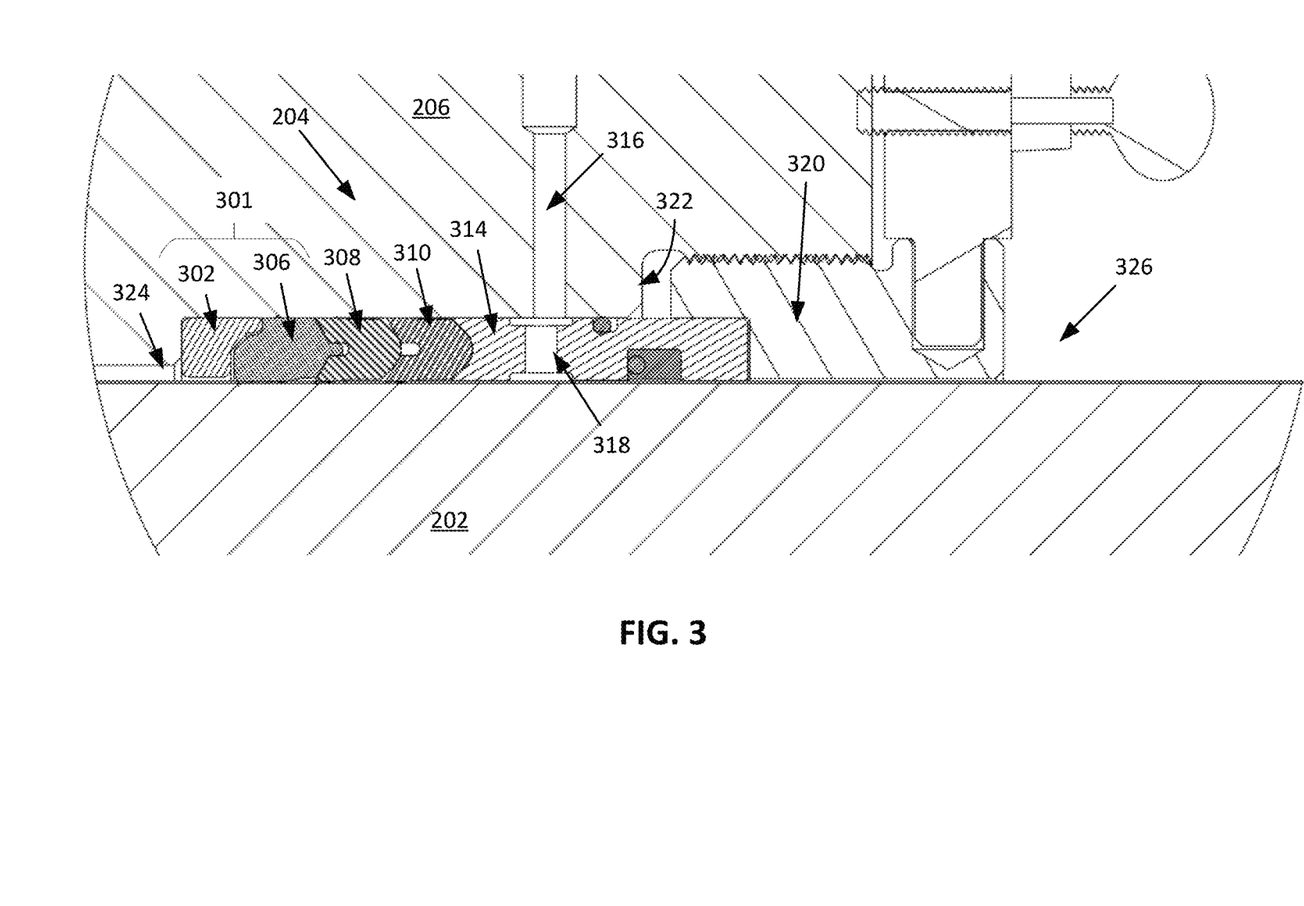
FIG. 3 is an enlarged view of a portion of the cross sectional view of FIG. 2, the enlarged view illustrating a first example embodiment of a packing arrangement included in the fluid end of the reciprocating pump that includes a first example embodiment of the scraper ring assembly presented herein.
Figure 4:
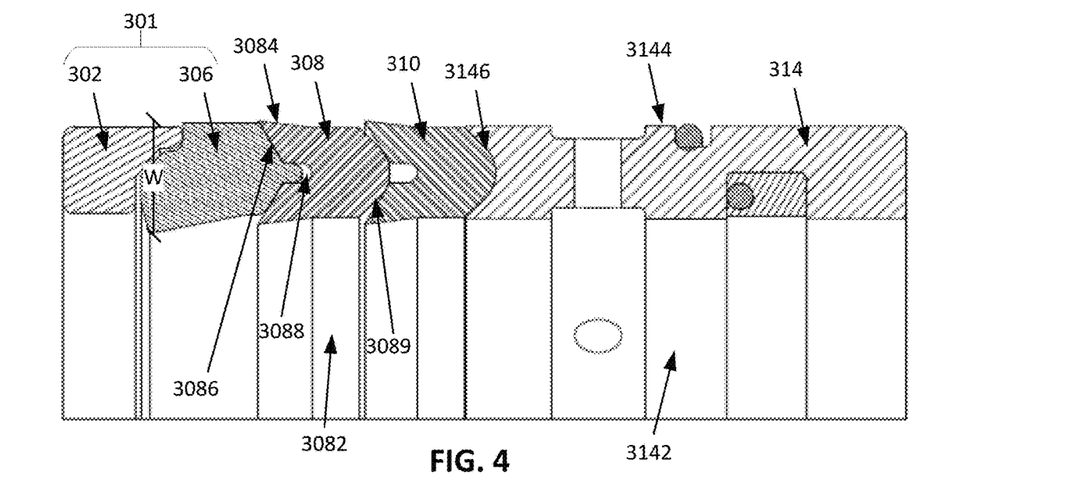
FIG. 4 is an enlarged cross sectional view of the packing arrangement of FIG. 3 when removed from the reciprocating pump.

FIGS. 3 and 4 show an example embodiment of a packing arrangement 204. In FIG. 3, the packing arrangement 204 is illustrated within a packing box 322 that is formed as part of the casing 206 of the fluid end 104 of reciprocating pump 100. Meanwhile, in FIG. 4, the packing arrangement 204 is illustrated independent of the casing 206. As is discussed in detail below, when the packing arrangement 204 is disposed in the casing 206, compression of the packing arrangement 204 causes the packing arrangement 204 to seal against the casing 206 and the plunger 202. Overall, the packing arrangement 204 includes scraper ring assembly 301, a first pressure ring 308, a second pressure ring 310, a lantern ring 314, and a packing nut 320. As is discussed in detail below, the scraper ring assembly 301 includes at least two rings, which may be referred to herein as first ring 306 (or scraper ring 306) and a second ring 302 (or junk ring 302).

Before discussing the packing arrangement 204 in detail it is important to understand the terms "upstream" and "downstream." Any flow through the packing arrangement 204 or between the packing arrangement 204 and the plunger 202 flows from a high pressure side 324 of the packing box 322 to a low pressure side 326. Thus, if a first component is described as being "upstream" of a second component, the first component will be closer to the high pressure side 324 than the second component. Likewise, if a first component is described as being "downstream" of a second component, the first component will be closer to the low pressure side 326 than the second component.

In the depicted packing arrangement 204, the scraper ring assembly 301 is positioned adjacent the high pressure side 324. Specifically, the second ring 302 is positioned within the packing box 322 adjacent the high pressure side 324 and the first ring 306 is positioned immediately downstream of the second ring 302. The features of the first ring 306 and the second ring 302 are described in detail below, but regardless, in other embodiments, the scraper ring assembly 301 need not be adjacent the high pressure side 324.

In the depicted embodiment, the remainder of the packing arrangement 204 is disposed downstream of the scraper ring assembly 301. Specifically, in the depicted embodiment, the first pressure ring 308 is downstream of the scraper ring assembly 301, the second pressure ring 310 is downstream of the first pressure ring 308, the lantern ring 314 is downstream of the second pressure ring 310, and the packing nut 320 is downstream of the lantern ring 314. However, in other embodiments, the packing arrangement might include any combination of components arranged in any order. For example, an alternative embodiment might include only one pressure ring, three or more pressure rings, any number of support rings, or any other such rings, and each of these components may have suitable axial dimensions to collectively span the axial distance between the second ring 302 and the packing nut 320 (each of which might also have varied dimensions across different embodiments).

Still referring to FIGS. 3 and 4, the first pressure ring 308 is an annular ring that includes a tapered cylindrical inner surface 3082 that abuts the plunger 202 and a tapered cylindrical outer surface 3084 that abuts the bore of the packing box 322. An upstream (high pressure) side 3086 of the first pressure ring 308 includes a female chevron portion arranged to receive the male chevron portion of the first ring 306 included in the scraper ring assembly 301. An aperture 3088 is formed in the female chevron portion and provides a relief space that allows the legs of the female chevron portion to flex inwards in response to compression (e.g., generated by the rigid sides of the bore 318 and plunger 202).

The downstream (low pressure) side 3089 of the first pressure ring 308 includes a male chevron portion with an apex that extends toward the low pressure side 326 of the packing box 322. In at least some embodiments, the male chevron portion and the female chevron portion have like dimensions so that the downstream side 3089 of first pressure ring 308 matches or mirrors the upstream side 3086 of the first pressure ring 308. However, the downstream side 3089 need not necessarily match or mirror the upstream side 3086.

In the depicted embodiment, the second pressure ring 310 is identical to the first pressure ring 308. However, in other embodiments, the second pressure ring 310 could have different dimensions as compared to the first pressure ring 308. For example, the second pressure ring 310 could have a different height (insofar as "height" refers to a dimension spanning the flow or axial direction), different upstream chevron shape, different aperture shape, different aperture size, and/or different downstream chevron shape as compared to the first pressure ring 308.

Regardless of the dimensions, features, and/or characteristics of pressure rings 308 and 310, pressure rings 308 and 310 may be the primary sealing components of the packing arrangement 204, bearing the brunt of the pressure applied by the high pressure fluid within the pumping chamber 208. Therefore, the pressure rings 308, 310 may be stiff or inflexible and lack springiness, at least as compared to one or more rings included in scraper ring assembly 301. For example, in at least some embodiments, the first pressure ring 308 and the second pressure ring 310 are formed from an elastomer impregnated aramid fabric, but in other embodiments, one or both of pressure ring 308 and pressure ring 310 may be formed from other suitable materials.

The lantern ring 314 is an elongated annular ring that includes an inner cylindrical surface 3142 that faces the plunger and an outer cylindrical surface 3144 that faces the inner surface of the packing box 322 (see FIG. 4). The upstream (high pressure) side 3146 of lantern ring 314 includes a female chevron portion that is arranged to receive the male chevron portion of the second pressure ring 310 (see FIG. 4). In at least some embodiments, the lantern ring 314 is formed from a metal such as aluminum, bronze, or an aluminum-bronze alloy. Thus, the lantern ring 314 may, in at least some embodiments, include sealing elements (e.g., O-rings or annular seals) embedded therein (not labeled). The lantern ring 314 may also include one or more lube oil bores 318 that extend between its inner surface 3142 and its outer surface 3144 to provide a flow path for lube oil that is delivered to the packing arrangement 204 via an oil passage 316 formed in casing 206 (see FIG. 3). The lube oil creates a pressure seal that enhances the function of the packing arrangement 204 while also providing lubrication between the plunger 202 and the packing arrangement 204.

As is shown in FIG. 3, the packing nut 320 threadably engages the casing 206. The threaded engagement allows the packing nut 320 to compress the lantern ring 314 against the second pressure ring 310, the first pressure ring 308, and the first ring 306 (which may be referred to collectively as a "stack"). This compression causes the stack to expand radially, towards the outer wall or bore of the packing box 322 and the outer surface of the plunger 202. This radial expansion creates seals between: (1) the stack and the outer wall or bore of the packing box 322; and (2) the stack and the outer surface of the plunger 202.

Figure 5:
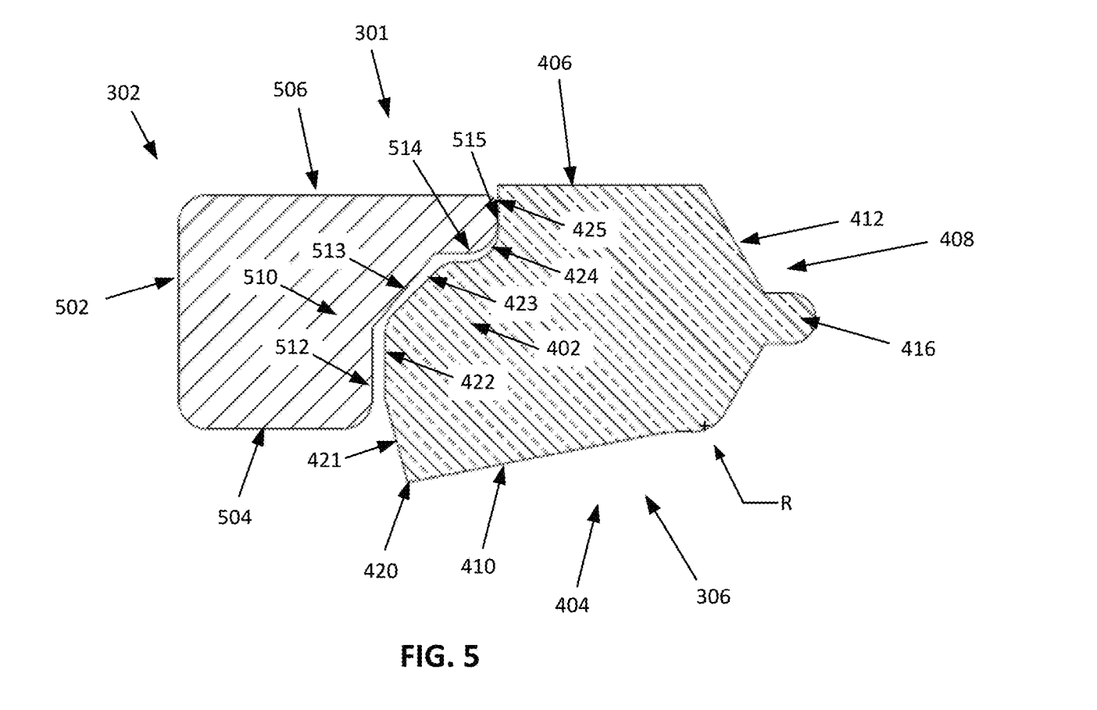
FIG. 5 is an enlarged cross sectional view of the scraper ring assembly included in the packing arrangement of FIG. 3.
Figure 6:
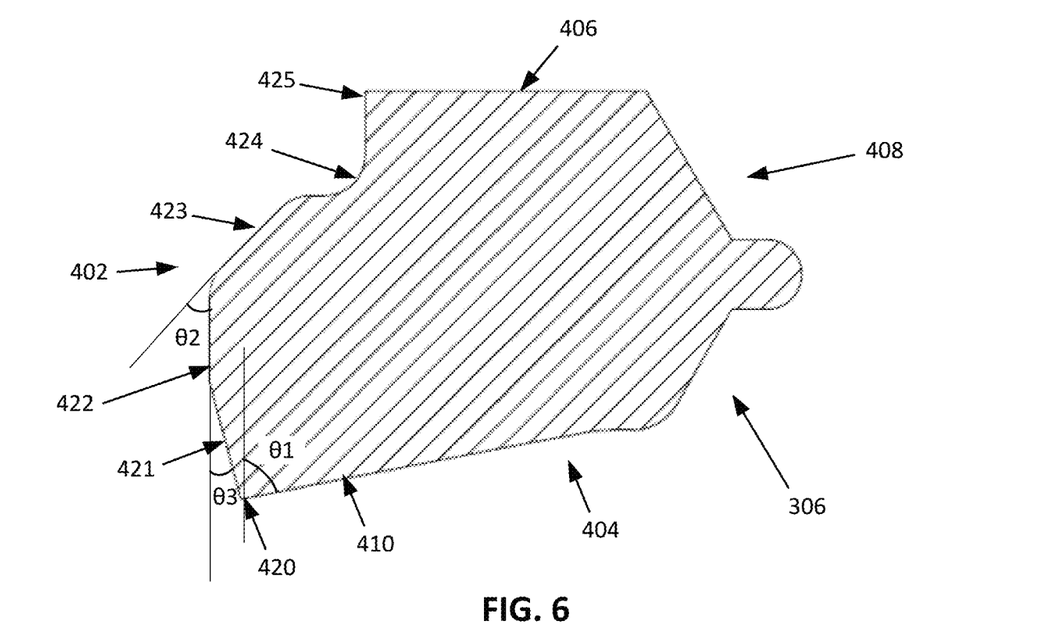
FIG. 6 is an enlarged view of a cross-section of a first ring included in the scraper ring assembly of FIG. 5.
Figure 7:
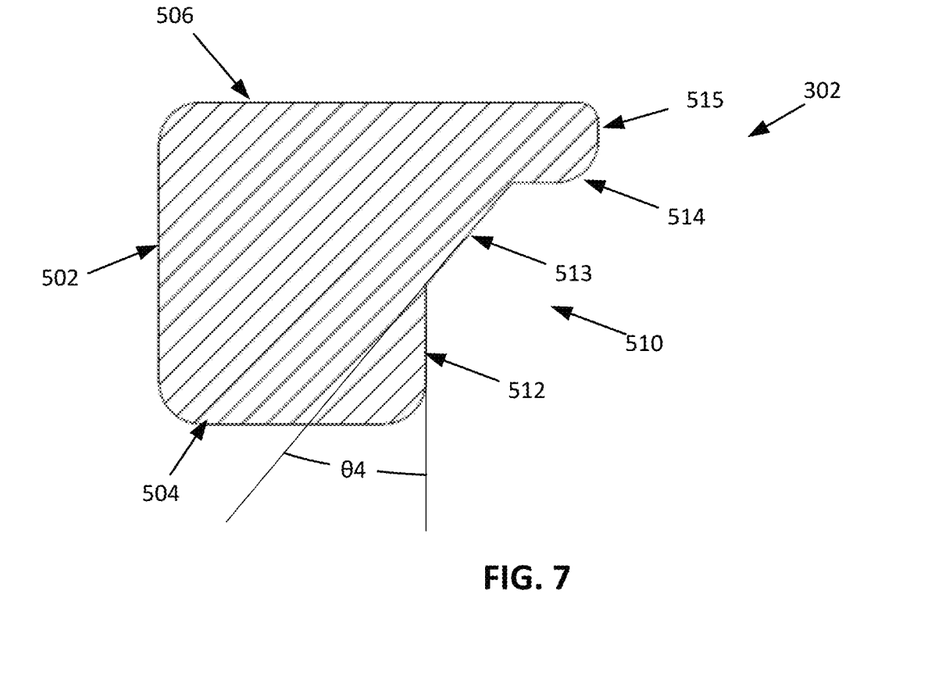
FIG. 7 is an enlarged view of a cross-section of a second ring included in the scraper ring assembly of FIG. 5.

Now turning to FIGS. 5-7 for a description of an example embodiment of a scraper ring assembly 301. Generally, the scraper ring assembly presented herein includes rings with geometries specifically designed to form a tight and effective seal against the plunger 202 over a long lifespan. Specifically, the scraper ring assembly 301 includes a first ring 306 configured to mate with a second ring 302 in a manner that cams or pushes the first ring 306 into contact in response to axial compression of the first ring 306. Additionally, the geometries may be designed to prevent, or at least discourage, debris from being trapped against the scraper ring assembly 301 and/or grinding against sealing areas of the packing arrangement 204. To achieve this, at least the first ring 306 of the scraper ring assembly 301 has a geometry configured to scrape debris off a plunger once compressed and sealed thereagainst. Each of these features is addressed in turn below.

However, before turning to the aforementioned features, it is important to understand the compositions of the first ring 306 (i.e., the scraper ring 306) and the second ring 302 (i.e., the junk ring 302). The scraper ring 306, or portions thereof may be fabricated from any commonly used resilient materials, such as homogeneous elastomers, filled elastomers, partially fabric reinforced elastomers, and full fabric reinforced elastomers. Suitable resilient elastomeric materials includes, but re not limited to, thermoplastic polyurethane (TPU), thermoplastic copolyester (COPE), ethylene propylene diene monomer (EPDM), highly saturated nitrile rubber (HNBR), reinforced versions of the foregoing materials, such as versions reinforced with fibers or laminations of woven material, as well as combinations of any of the foregoing materials. Forming the first ring 306 from a resilient material allows the first ring 306 to expand radially in response to axial compression and form a seal against the plunger and/or the casing of a reciprocal pump.

By comparison, the second ring 302 (i.e., junk ring 302), or portions thereof, may be fabricated from any foregoing materials and/or from metals, metal alloys, and/or plastics. Thus, in at least some embodiments, the second ring 302 may have a resiliency that is less than the resiliency of the first ring 306. Put another way, the first ring 306 may have a first resiliency and the second ring 302 may have a second resiliency that is less than the first resiliency, insofar as "resiliency" is used herein to describe stiffness, pliability, and other such characteristics and may be represented by, for example, a durometer measurement. In these embodiments, the second ring 302 may resist axial forces generated by compression of the first ring 306 against the second ring 302 (e.g., when the scraper ring assembly 301 is compressed in the upstream direction) so that the axial compression causes the first ring 306 to expand radially.

As a specific example, the first ring 306 may be manufactured from a resilient elastomer and the second ring 302 may be fabricated from steel, aluminum, bronze, brass, plastic(s) and/or composite plastic(s). Such compositions may be particularly useful when the scraper ring assembly 301 is immediately adjacent the upstream side 324 of a packing box 322 (e.g., abutting a metal casing), as is depicted in FIGS. 3-5. In these instances, the second ring 302 may act similar to a conventional metal junk ring that shrinks the gap between the casing and the plunger upstream of resilient sealing rings.

However, to be clear, for the purposes of this application, the term "junk ring" does not signify that a ring is a metal or metal alloy ring nor does the term "junk ring" require a particular placement in the stack. Instead, "junk ring" is an alternate term used to describe the second ring 302 of the scraper ring assembly 301 and is only used because the second ring 302 may, in some embodiments, perform tasks often performed by a conventional junk ring (among other tasks). In fact, in some embodiments, forming the second ring 302 from a plastic or plastic composite may provide advantages over traditional metal junk rings. First, manufacturing the second ring 302 from plastic and/or plastic composite(s) may reduce manufacturing costs as compared to manufacturing from metal. For example, plastics and plastic composites can be molded and quickly mass produced while also avoiding the material costs associated with metal. Second, a plastic or plastic composite ring may be lighter than a metal ring and, thus, may be easier to install in a reciprocating pump. Finally, plastics do not typically have recycling value and thus, will discourage theft for recycling value.

Figure 8:
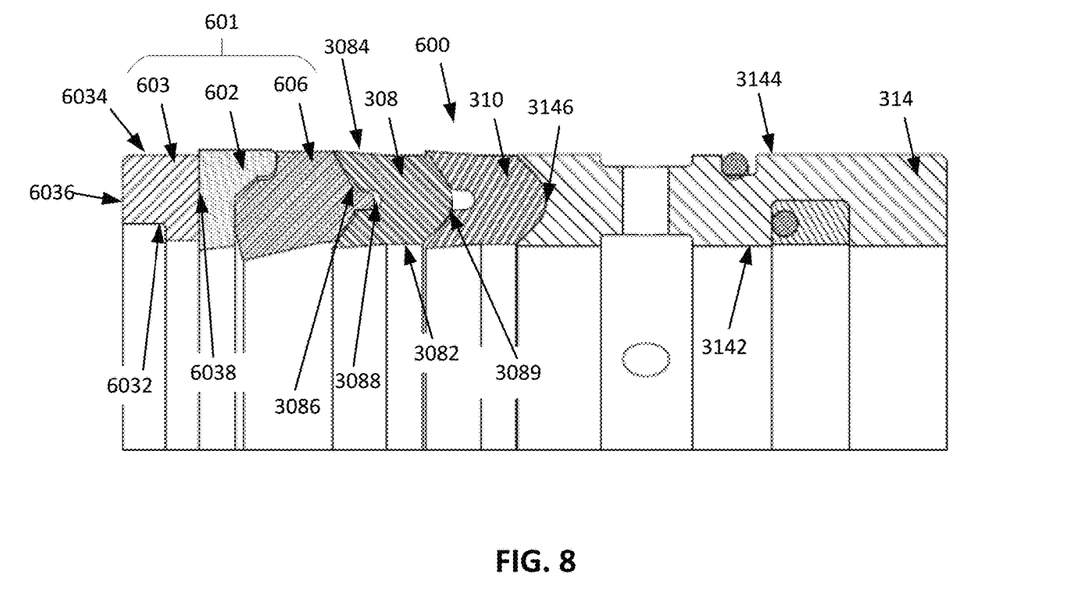
FIG. 8 is an enlarged cross sectional view of a second example packing arrangement that may be included in the reciprocating pump of FIG. 1, the second example packing arrangement including a second example embodiment of the scraper ring assembly presented herein and being illustrated while removed from the reciprocating pump.
Figure 9:
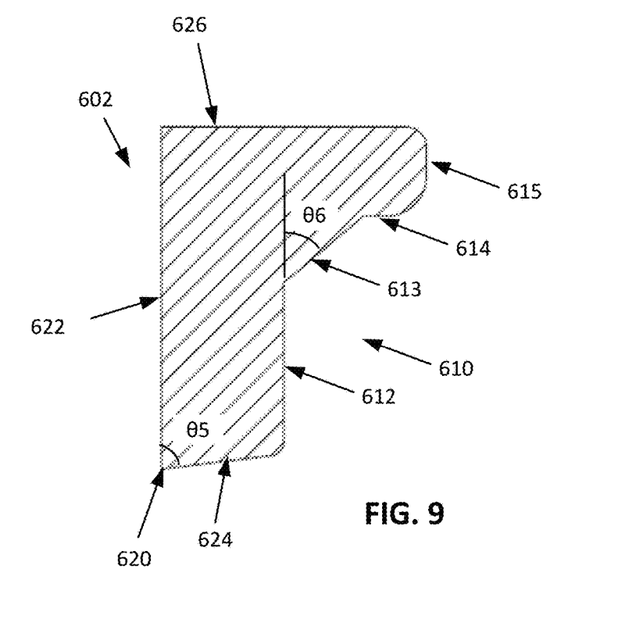
FIG. 9 is an enlarged view of a cross-section of a second ring included in the scraper ring assembly of FIG. 8.

Alternatively, the second ring 302 may be fabricated from at least the same materials, or similar materials, as the first ring 306 and may have the same resiliency as or a similar resiliency to the first ring 306. In these embodiments, the first ring 306 and the second ring 302 may both expand radially in response to axial compression (e.g., when the scraper ring assembly 301 is compressed in the upstream direction); however, the amount of axial compression of each of ring 302 and ring 306 may depend on its resiliency (e.g., on the particular materials and construction used to form the ring). Such compositions may be particularly useful when the scraper ring assembly 301 includes a third ring and/or is downstream of another ring so that the scraper ring assembly 301 is not at an upstream end of a stack (and, thus, not immediately adjacent the upstream side 324 of a packing box 322 and abutting a metal casing). An example scraper ring assembly 301 with three rings is depicted in FIGS. 8 and 9 and is discussed in details below.

Now turning to the two aforementioned features of the scraper ring assembly 301 depicted in FIGS. 5-7, first, the first ring 306 (i.e., the scraper ring) includes an upstream face 402 with a geometry configured to engage a corresponding geometry included on a downstream face 510 of the second ring 302 (i.e., the junk ring). In particular, moving from the inner surface 504 of the second ring 302 to the exterior surface 506 of the second ring 302, the downstream face 510 includes a planar section 512, a skew section 513, an arcuate section 514, and an exterior section 515. Meanwhile, moving from the inner surface 404 of the first ring 306 to the exterior surface 406 of the first ring 306, the upstream face 402 includes a scraping section 421, a planar section 422, a skew section 423, an arcuate section 424, and an exterior section 425.

The caroming action between the first ring 306 and the second ring 302 may be driven largely by arcuate sections 424 and 514, skew sections 423 and 513, and planar sections 422 and 512. These sections are specifically designed to provide enough space for the first ring 306 to compress and cam during installation, while minimizing any space where debris might be trapped during pump use. For example, arcuate sections 424 and 514 may have identical or nearly identical radiuses to form a tight fit and provide a fulcrum point from which the first ring may expand radially in both directions.

Meanwhile, planar section 512 (of second ring 302) may have a width or radial dimension that is larger than the width or radial dimension of planar section 422 (of first ring 306). Additionally or alternatively, the skew section 513 (of second ring 302) may extend away from the planar section 512 (of second ring 302) at an exterior angle θ4 that is smaller than an exterior angle θ2 at which the skew section 423 (of first ring 306) extends away from the planar section 422 (of first ring 306) (see FIGS. 6-7 for reference). As a specific, non-limiting example, the skew section 423 may extend away from the planar section 422 in a downstream direction at an exterior angle θ2 in the range of approximately 42° to approximately 48°. Meanwhile, as another non-limiting example, the skew section 513 may extend away from the planar section 512 in a downstream direction at an exterior angle θ4 of approximately 40°.

The longer planar section 512 of the second ring 302 may provide a surface along which the planar section 422 of the first ring 306 can slide or cam. The smaller exterior angle θ4 may provide space into which the first ring 306 can expand while also creating a ramp that pushes the skew section 423 of the first ring 306 radially inwards. This camming urges the scraping section 421 radially inwards, compressing the scraping section 421 against a plunger of a reciprocating pump so that the scraping section 421 forms a seal with the plunger and scrapes debris off the plunger.

These example dimensions and ranges are merely examples and other ranges may also be suitable. For example, in other embodiments, angles θ2 and θ4 may be any angle over a range of approximately 40° to approximately 50°, approximately 35° to approximately 55° or even approximately 25° to approximately 65°, provided that the combination of angles can cause suitable camming of the scraping section 421 towards the plunger 202 of a reciprocating pump 100 (e.g., provided that that angles θ4 is smaller than angle θ2).

The scraping section 421 of the upstream face 402 of the first ring 306 extends radially inwards from the planar section 422, beyond the planar section 512 of the downstream face 510 of the second ring 302, as can be seen in FIG. 5. Thus, the scraping section 421 may seal a gap between the stack and the plunger 202 of a reciprocating pump 100, such as a reduced gap defined by the second ring 302. That is, the second ring 302 may have a radial dimension or width, as measured between its exterior surface 506 and its inner surface 504 that closes a portion of a gap between a plunger 202 and a casing 206, while the first ring 306 may extend beyond this width to close any remaining, smaller gaps downstream of the second ring 302.

Moreover, the scraping section 421 of the upstream face 402 of the first ring 306 extends away from the planar section 422 of the upstream face 402 in a downstream direction at an angle θ3. Angle θ3 is carefully selected so that when the first ring 306 is axially compressed and expands radially into a plunger of a reciprocating pump, the scraping section 421 moves into alignment or nearly into alignment with the planar section 422. That is, radial expansion into the plunger will create normal forces on the inner surface 404 that push the scraping section 421 in an upstream direction. Thus, after compression, the scraping section 421 may extend away from a plunger at a right angle or nearly a right angle, such as angle in the range of approximately 88° to approximately 92°, approximately 85° to approximately 95°, or approximately 80° to approximately 100°. To achieve this, angle θ3 may be an angle in the range of approximately 12° to approximately 18°. However, this is just an example and, in other embodiments, angle θ3 may be any angle over a range of approximately 10° to approximately 20°, approximately 8° to approximately 22° or even approximately 5° to approximately 25°, provided that angle θ3 encourages the scraping section 421 to respond to axial compression by forming a near perpendicular surface against a plunger 202.

Finally, the exterior section 425 is sized and positioned to mate with the exterior section 515. Both section 425 and section 515 may be substantially planar and, thus, may facilitate radial expansion of one of exterior section 425 and exterior section 515 with respect to the other. In at least some embodiments, the exterior section 515 of second ring 302 may have a radial dimension or width that is slightly smaller than the radial dimension or width of the exterior section 425 of first ring 306. This may ensure that the first ring 306 can seal against a casing 206 of a reciprocal pump 100 and/or may ensure proper tolerance during installation of the first ring 306 and the second ring 302, especially if the second ring 302 is formed from metal or metal-like materials.

Now referring to FIGS. 4-6, the scraper ring assembly 301 can effectively scrape debris off a plunger 202 on which it is sealed due, at least in part, to the specific geometry of the inner surface 404 of the first ring 306. As can be seen, the upstream face 402 of the scraper ring 306 (i.e., the first ring) defines the largest inwards radial extension of the scraper ring assembly 301. Put another way, overall, the upstream face 402 has a width W (see FIG. 4) that defines the widest or maximum width of the scraper ring 306 (and of scraper ring assembly 301). Then, the inner surface 404 tapers inwards from the upstream face 402 so that the scraper ring 306 does not have or define a pedestal. Additionally, the second ring 302 includes a flat or planar upstream face 502 that does not define a pedestal. Thus, when the scraper ring assembly 301 is used as the first ring of a packing arrangement, it may protect downstream rings, as well as downstream portions of the scraper ring 306, without exposing a pedestal to high pressure fluid and debris.

By comparison, many conventional rings that are used as the first ring of a stack have pedestals or steps defined in their upstream faces. In most of these conventional scraper rings with pedestals, the pedestals help ensure that pressure does not act away from the piston to cause "blow-by leakage" that prevents sealing between the first ring and the piston. However, these pedestals also create a pocket of space adjacent the upstream face of the first ring in which debris can be trapped. Then, reciprocation of the plunger may cause this trapped debris to grind against and damage the first ring, accelerating seal wear and eventually leading to seal failure and leakage that requires pump maintenance (and likely down time). This phenomenon is known as "nibbling" and can significantly reduce the lifespan of the first ring.

To address pedestal nibbling, some conventional packing rings have attempted to strengthen the pedestal or adjacent portions of a packing ring. However, such solutions do not eliminate pedestal nibbling; they simply aim to slow the pedestal nibbling. Such solutions may also require expensive materials or manufacturing techniques. In contrast, the rings of the scraper ring assembly presented herein do not include a pedestal and, thus avoid these issues entirely when used as the first ring in a stack. Instead, the first ring 306 of the scraper ring assembly 301 presented herein includes an upstream face 402 that defines the widest or maximum width of the scraper ring 306. Meanwhile, the geometry and/or the compression forces provided by the packing nut 320 may be adequate to prevent blow-by leakage. For example, the camming created by the interface between the first ring 306 and the second ring 302 may counteract any pressure that tends to encourage blow-by leakage.

Still referring to FIGS. 4-6, in the depicted embodiment, the inner surface 404 of first ring 306 has a tapered section 410 that tapers away from the plunger 202 along a downstream direction, thereby ensuring that the scraper ring is widest at the upstream face. In particular, the tapered section 410 extends away from the upstream face 402 so that it forms a right or acute angle θ1 (e.g., less than or approximately equal 90°) with respect to a radial axis (see FIG. 6). Put another way, the tapered section 410 tapers in a radial direction towards an exterior surface 406 of the scraper ring 306. Angle θ1 ensures that the tapered section 410 tapers away from the plunger 202 and that a sharp edge 420 is formed between the inner surface 404 and the upstream face 402, insofar as "sharp" is used herein to describe a corner that may be acute or right from the perspective of the plunger.

In fact, as mentioned above, when the first ring 306 is compressed, for example by the packing nut 320, and expands radially into the plunger 202, the scraper section 421 of the upstream face 402 may move in an upstream direction so that the edge 420 is approximately perpendicular to the plunger. That is, edge 420 may move towards or into axial alignment with planar section 422, thereby softening (e.g., decreasing) the angle θ3 of the scraping section 421 until the tapered section 410 is approximately perpendicular (e.g., forms a angle in the range of approximately 85° to approximately 95°. Consequently, after the first ring 306 is compressed, the sharp leading edge 420 may peel or scrape debris off the plunger 202, protecting any downstream rings from exposure to this damaging debris.

In view of the foregoing, angle θ1 is carefully selected in view of the stiffness of the first ring 306 and/or the overall dimensions of the first ring 306. For example, in the depicted embodiment, the θ1 is any angle in the range of approximately 76° to approximately 82°. However, in other embodiments, angle θ1 may be any angle over a range of approximately 74° to approximately 80°, approximately 74° to approximately 84°, approximately 72° to approximately 86°, or even approximately 65° to approximately 89°.

Still further, in the depicted embodiment, the tapered section 410 extends directly from upstream face 402. However, in other embodiments, the tapered section 410 need not extend directly from the upstream face 402. Instead, a cylindrical section may be disposed therebetween so that, for example, the scraper ring defines a first section of constant width adjacent the upstream face 402 and then tapers towards a narrower width as you move downstream. Additionally or alternatively, the inner surface 404 and/or the taper section 410 need not have a single linear taper and, in some embodiments, can have multiple slopes or subsections, whether linear, curved (e.g., parabolic), or shaped in any other way. The inner surface 404 may also include any number of sections. Regardless, the upstream face 402 can define the maximum width W of the scraper ring 306 (see FIG. 4).

When the width of the scraper ring 306 tapers from the upstream face 402, the magnitude of normal forces acting against the inner surface 404 during compression of the scraper ring 306 (e.g., via tightening packing nut 320) will decrease moving in a downstream direction along the tapered section 410. Put another way, when compression causes radial expansion of the scraper ring 306, the normal forces acting against the radial expansion will have the largest magnitude at the upstream face 402 of the scraper ring 306 (and potentially adjacent the upstream face 402 if a cylindrical section is disposed between the upstream face 402 and the tapered section 410). This concentration of strong sealing forces at the upstream and leading edge 420 of the scraper ring 306 creates a barrier that prevents debris from grinding into a sealing area in a middle axial portion of scraper ring 306 (i.e., a secondary sealing area of the scraper ring 306), prolonging seal life.

Still referring to FIGS. 4-6, the first ring 306 also includes an exterior surface 406 and a downstream face 408. In the depicted embodiment, the exterior surface 406 is orthogonal to the exterior section 425 of the upstream face 402; however, in other embodiments, the exterior surface 406 may have any shape that is suitable for an exterior of a packing ring, whether now known or developed hereafter. Also, in the depicted embodiment, the downstream face 408 has a male chevron 412 with a protrusion 416 extending from an apex of the male chevron 412 (see FIG. 5), but in other embodiments, the downstream face 408 may have any shape that is suitable for a downstream face of a packing ring, whether now known or developed hereafter.

For example, the downstream face 408 may have any configuration that allows the scraper ring 306 to mate, interface, couple, seat against, or otherwise be packed with any other desirable packing rings. That said, in the depicted embodiment, the upstream side 308б of the first pressure ring 308 has a female chevron with an aperture 308в so the male chevron 412 and protrusion 416 included on the downstream face 408 of the scraper ring may mate appropriately with the remainder of the stack via the first pressure ring 308 for additional seal redundancy. Moreover, in the depicted embodiment, the downstream face 408 of the scraper ring is connected to the inner surface 404 by a radius R1 in a range of approximately 0.055 inches to approximately 0.095 inches; however, in other embodiments, radius R1 may be any size or this connection may be a sharp corner.

Now turning to FIGS. 5 and 7, as mentioned, the second ring 302 may include an exterior surface 506 and an interior surface 504 that each extend orthogonally with respect to both the upstream face 502 and the downstream face 510 (e.g., with respect to the exterior section 515 and the planar section 512, respectively). However, in other embodiments, the exterior surface 506 may have any shape that is suitable for an exterior of a packing ring, whether now known or developed hereafter, and the interior surface 504 may have any shape that is suitable for an interior of a packing ring, whether now known or developed hereafter. Likewise, the upstream face 502 may have any shape that is suitable for an engaging with a high pressure side 324 of a packing box 322 and/or an upstream ring, whether now known or developed hereafter. For example, although the depicted upstream face 502 is planar, the upstream face 502 could, in other embodiments include or define one or more steps and/or a chevron.

That said, generally, the radial dimensions of the second ring 302 are primarily selected to reduce the size of the gap between the casing 206 and the plunger 202 so that high pressure fluid acts on a smaller annular portion of a ring immediately downstream of the second ring 302, such as first ring 306. Additionally or alternatively, in some embodiments, the inner surface 504 and exterior surface 506 may define radial (i.e., lateral) dimensions that are at least slightly smaller than sealing components of the packing arrangement (e.g., first ring 306, first pressure ring 308, and second pressure ring 310) to ensure that a hard material, if used to form the second ring 302, has appropriate clearances within the packing box 322.

Now turning to FIGS. 8 and 9, these Figures illustrate a packing arrangement 600 including a scraper ring assembly 601 formed in accordance with a second embodiment. This alternative embodiment scraper ring assembly 601 includes three rings: a first ring 606 that is substantially similar to the first ring 306 of scraper ring assembly 301; a second ring 602 that is substantially similar to the second ring 302 of scraper ring assembly 301; and a third ring 603 disposed upstream of the second ring 602.

In this embodiment, the first ring 606 of scraper ring assembly 601 may be axially shorter that the first ring 306 of scraper ring assembly 301; however, the lateral and angular dimensions of the first ring 606 may be substantially similar to corresponding dimensions of the first ring 306. For example, in one embodiment, aside from the taper angle θ1, all of the lateral and angular dimensions of rings 306 and 606 may be identical between rings 306 and 606. And, the taper angle θ1 may only be smaller in first ring 606 to accommodate the shrinking of the axial length of ring 606 (as compared to ring 306) while the radial width is maintained (as required by trigonometric principles). However, even with this change, taper angle θ1 may still fall within the angular ranges discussed above for angle θ1. Thus, for brevity, the description of FIGS. 8 and 9 focuses on the other rings of scraper ring assembly 601, or at least on portions of these rings that differ from like portions of like rings included in scraper ring assembly 301. However, any description of like numerals included herein should be understood to apply to like components or features of FIGS. 8 and 9.

Generally, the second ring 602 of scraper ring assembly 601 may have an overall appearance that resembles the second ring 302 of scraper ring assembly 301. However, the second ring 602 may be axially shorter than the second ring 302, may have a different inner surface than the second ring 302, have different radial dimensions (i.e., a different width), and may have downstream face 610 with the different dimensions than the downstream face 510 of the second ring 302. The differences in axial length between the first and second rings 606, 602 of scraper ring assembly 601 and the corresponding rings 306, 302 of scraper ring assembly 301 allow the scraper ring assembly 601 to accommodate third ring 603 in the limited axial space of the packing box 322. The latter three differences may allow the second ring 602 to seal against a plunger and scrape debris therefrom, in combination with the first ring 606 and/or in lieu of the first ring 606. Each of these differences is described in turn below.

First, the second ring 602 includes a planar upstream face 622 and an interior surface 624 that extends away from the planar upstream face 622 at acute interior angle θ5 (e.g., less than 90°). Put another way, the interior surface 624 tapers in a radial direction towards an exterior surface 626 of the second ring 602. Acute angle θ5 ensures that the interior surface 624 tapers away from the plunger 202 and that the inner surface 624 and the upstream face 622 for a sharp edge 620 therebetween, insofar as "sharp" is used in the manner defined above with respect to first ring 306 of scraper ring assembly 301. For example, in the depicted embodiment, angle θ5 is in the range of approximately 83° to approximately 89°. However, in other embodiments, angle θ5 may be any angle over a range of approximately 80° to approximately 89°, approximately 75° to approximately 89°, or even approximately 60° to approximately 89°.

As is discussed in detail above with respect to first ring 306 of scraper ring assembly 301, a sharp leading edge that is followed by an inward taper—so that the leading edge defines the widest portion of a ring—allows a ring formed of resilient elastomer material to create an effective seal and scrape debris of a plunger. Thus, when second ring 602 is formed of a resilient elastomer material (an option that is discussed in detail above), the interior surface 624 of second ring 602 may achieve the same or similar advantages as the interior surfaces of first rings 606 and 306. With such an arrangement, the first ring 606 may provide redundant or secondary sealing and scraping (e.g., until the second ring 602 fails) and/or may provide primary sealing and scraping (e.g., in combination with second ring 602 and/or after failure of the second ring 602). Consequently, this arrangement may extend the lifespan of a packing arrangement beyond the lifespan of a packing arrangement with a single sealing/scraping ring (e.g., packing arrangement 204).

Second, the radial dimensions of the second ring 602— the width or distance between an interior surface 624 and an exterior surface 626—may be larger than the radial dimensions of second ring 302. This may allow the second ring 602 to compress and seal against both a casing 206 and a plunger 202 of a reciprocating pump 100. The smaller width of second ring 302 may provide installation clearance for a metal or metal-like (i.e., a less resilient) ring while second ring 602 may be formed from a more resilient material that can be installed with smaller clearances.

Third, the second ring 602 may have downstream face 610 with different dimensions than the downstream face 510 of the second ring 302. That is, although the downstream face 610 includes a planar section 612, a skew section 613, an arcuate section 614, and an exterior section 615 that are similar to the planar section 512, the skew section 513, the arcuate section 514, and the exterior section 515 of second ring 302, the sections of second ring 602 may have different dimensions. For example, since the second ring 602 includes a tapered interior surface 624 configured to engage and seal against a plunger 202, the planar section 612 may be longer than planar section 512. Additionally, exterior section 615 may be wider than exterior section 515 so that the exterior section 615 can seal and/or deform against a casing 206 and/or provide structural stability that prevents quick deterioration.

As another example, the skew section 613 may extend away from the planar section 612 in a downstream direction at an exterior angle θ6 that is larger than the corresponding exterior angle θ4 included in the second ring 302. For example, in the depicted embodiment, angle θ6 is in the range of approximately 47° to approximately 53°. However, in other embodiments, angle θ6 need not be larger than angle θ4 and may be any angle over a range of approximately 45° to approximately 55°, approximately 40° to approximately 60°, or even approximately 25° to approximately 65°, provided that the angle θ4 can facilitate camming of a skew surface included on a corresponding first ring (e.g., skew section 423). That is, skew section can extend at any angle θ4 that provides space into which the first ring 606 can expand while still ensuring that the skew section 613 can still act as a ramp to push the first ring 606 radially inwards to compress against a plunger 202 of a reciprocating pump 100.

Still referring to FIGS. 8 and 9, but now with an emphasis on FIG. 8, in this embodiment, the third ring 603 may be a ring formed from a metal or metal-like material. For example, the third ring may be formed from steel, aluminum, bronze, brass, plastic(s) and/or composite plastic(s). In some instances, metals may ensure the third ring 603 lasts at least as long as first ring 606 and second ring 602; however, plastics and/or plastic composites may also achieve such a lifespan while offering the advantages discussed above in connection with second ring 302.

The third ring 603 is also annular in shape with a cylindrical inner surface 6032 and a cylindrical outside surface 6034. Since the third ring 603 is formed from a metal or metal-like material, the inner surface 6032 and outer surface 6034 may have radial (i.e., lateral) dimensions that are at least slightly smaller than the remaining components of the packing arrangement (e.g., first ring 606 and second ring 602). This ensures that the hard material of the third ring 603 has appropriate clearances for installation into or removal from a packing box. However, the radial dimensions of the third ring 603 are primarily selected to reduce the size of the gap between a casing 206 and a plunger 202 in a reciprocating pump 100 so that high pressure fluid acts on a smaller annular portion of a ring downstream of the third ring 603 (e.g., second ring 602 and/or first ring 606).

The third ring 603 also includes a stepped upstream surface 6036 (also referred to as a leading surface or lead surface) that can abut a planar surface of a high pressure side of a packing box in which the scraper ring assembly is disposed. In the depicted embodiment, each stepped portion of the leading surface 6036 (see FIG. 8) is substantially flat or planar. Opposite the upstream surface 6036 is a substantially flat or planar downstream surface 6038. The planar upstream surface 622 of the second ring 602 abuts the planar downstream surface 6038 of the third ring 603.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. For example, inner surface sections from one embodiment may be combined with inner surface sections from another embodiment to form a complete inner surface. Accordingly, it is appropriate that the appended claims be construed broadly and in a manner consistent with the scope of the disclosure as set forth in the following claims.

Similarly, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially". Also, any ranges provided herein should be understood to include their bounds, so that, for example, a range of 80-90 includes both 80 and 90.

The invention claimed is:

1. A packing arrangement for a fluid end of a reciprocating pump, the packing arrangement being installable within a packing box disposed at the fluid end and being arranged to form a seal with a plunger of the reciprocating pump, the packing arrangement comprising:
   one or more pressure rings; and
   a scraper ring assembly disposed upstream of the one or more pressure rings, the scraper ring assembly comprising two or more rings, the two or more rings including:
      a first ring formed from a resilient material configured to form the seal against the plunger, the first ring including an upstream face and an inner surface, wherein the upstream face and the inner surface cooperatively form a sharp leading edge of the first ring; and
      a second ring defining a camming surface configured to engage the upstream face of the first ring and urge the inner surface of the first ring inwards during compression of the first ring and the second ring against one another,
   wherein the sharp leading edge of the first ring is configured to be positioned inwardly beyond the second ring.

2. The packing arrangement of claim 1, further comprising:
   a packing nut disposed downstream of the one or more pressure rings and configured to compress at least the one or more pressure rings and the first ring of the scraper ring assembly to cause radial expansion of at least the one or more pressure rings and the first ring within the packing box.

3. The packing arrangement of claim 2, further comprising:
   a lantern ring disposed between the one or more pressure rings and the packing nut, the lantern ring defining one or more lube oil bores that allow lubricant to be delivered to an outer surface of the plunger.

4. The packing arrangement of claim 1, wherein the resilient material comprises at least a resilient elastomeric material.

5. The packing arrangement of claim 1, wherein the second ring is formed from the resilient material.

6. The packing arrangement of claim 1, wherein the resilient material has a first resiliency and the second ring is formed from a second material with a second resiliency that is less than the first resiliency.

7. The packing arrangement of claim 6, wherein the second material comprises steel, aluminum, bronze, brass, plastic, composite plastic, or some combination thereof.

8. The packing arrangement of claim 1, wherein the scraper ring assembly further comprises:
a third ring with a planar downstream surface, the second ring including an upstream face disposed opposite the camming surface, the upstream face configured to engage the planar downstream surface of the third ring, wherein the resilient material forming the first ring has a first resiliency and the third ring is formed from a third material with a third resiliency that is less than the first resiliency.

9. The packing arrangement of claim 8, wherein the third material comprises steel, aluminum, bronze, brass, plastic, composite plastic, or some combination thereof.

10. The packing arrangement of claim 1, wherein the inner surface defines a tapered section that tapers away from the plunger along a downstream direction so that the first ring is widest at the upstream face.

11. The packing arrangement of claim 1, wherein scraper ring assembly does not include a pedestal that forms a pocket of space.

12. An annular scraper ring assembly for a packing arrangement that can form a seal with a plunger included in a fluid end of a reciprocating pump, comprising:
two or more rings, including:
a first ring formed from a resilient material configured to form the seal against the plunger included in the fluid end of the reciprocating pump, the first ring including an upstream face and an inner surface, wherein the upstream face and the inner surface cooperatively form a sharp leading edge of the first ring; and
a second ring defining a camming surface configured to engage the upstream face of the first ring and urge the inner surface of the first ring inwards during compression of the first ring and the second ring against one another,
wherein the sharp leading edge of the first ring is configured to be positioned inwardly beyond the second ring.

13. The annular scraper ring assembly of claim 12, wherein the upstream face of the first ring comprises a first section and a second section extending from one another, the first section and the second section are oriented at a first angle with one another in an uncompressed configuration of the first ring, the first section and the second section are oriented at a second angle with one another during compression of the first ring and the second ring against one another, and the second angle is less than the first angle.

14. The annular scraper ring assembly of claim 13, wherein the camming surface of the second ring comprises a third section configured to engage the first section of the upstream face of the first ring, and the second section of the upstream face of the first ring extends away from the third section of the camming surface of the second ring in the uncompressed configuration.

15. The annular scraper ring assembly of claim 12, wherein the second ring is formed from the resilient material.

16. The annular scraper ring assembly of claim 12, wherein the resilient material has a first resiliency and the second ring is formed from a second material with a second resiliency that is less than the first resiliency.

17. The annular scraper ring assembly of claim 12, further comprising:
a third ring defining a planar downstream surface, the second ring including an upstream face disposed opposite the camming surface, the upstream face configured to engage the planar downstream surface of the third ring, wherein the resilient material forming the first ring has a first resiliency and the third ring is formed from a third material with a third resiliency that is less than the first resiliency.

18. The annular scraper ring assembly of claim 12, wherein the inner surface defines a tapered section that tapers away from the plunger along a downstream direction so that the first ring is widest at the upstream face.

19. A reciprocating pump, comprising:
a casing defining a pumping chamber;
a plunger configured to reciprocate in an axial direction within the pumping chamber; and
an annular scraper ring assembly that can form a seal with the plunger, the annular scraper ring assembly comprising two or more rings, including:
a first ring formed from a resilient material configured to form the seal against the plunger, the first ring including an upstream face and an inner surface, wherein the upstream face and the inner surface cooperatively form a sharp leading edge of the first ring; and
a second ring defining a camming surface configured to engage the upstream face of the first ring and urge the inner surface of the first ring inwards during compression of the first ring and the second ring against one another,
wherein the sharp leading edge of the first ring is configured to be positioned inwardly beyond the second ring.

20. The reciprocating pump of claim 19, wherein the annular scraper ring assembly further comprises:
a third ring defining a planar downstream surface, the second ring including an upstream face disposed opposite the camming surface, the upstream face configured to engage the planar downstream surface of the third ring, wherein the resilient material forming the first ring has a first resiliency and the third ring is formed from an additional material with a second resiliency that is less than the first resiliency.

* * * * *

UNITED STATES PATENT AND TRADEMARK OFFICE
CERTIFICATE OF CORRECTION

PATENT NO. : 11,692,544 B2
APPLICATION NO. : 16/953961
DATED : July 4, 2023
INVENTOR(S) : John Chase It is certified that error appears in the above-identified patent and that said Letters Patent is hereby corrected as shown below:

On the Title Page

Item (57), In the Abstract, Line 9, change "caroming" to --camming--.

Signed and Sealed this
Fifteenth Day of August, 2023

Katherine Kelly Vidal
*Director of the United States Patent and Trademark Office*